United States Patent [19]

Brodnax et al.

[11] Patent Number: 5,471,599
[45] Date of Patent: Nov. 28, 1995

[54] PARTITIONING OF VIRTUAL ADDRESSING MEMORY

[75] Inventors: Timothy B. Brodnax, Austin, Tex.; Bryan K. Bullis, Woodbridge, Va.; Steven A. King, Herndon, Va.; Dale A. Rickard, Manassas, Va.

[73] Assignee: International Business Machines Corporation, Armonk, N.Y.

[21] Appl. No.: 228,948

[22] Filed: Apr. 18, 1994

Related U.S. Application Data

[63] Continuation of Ser. No. 691,622, Apr. 25, 1991, abandoned.

[51] Int. Cl.$^6$ .................. G06F 12/10; G06F 12/00
[52] U.S. Cl. ................ 395/412; 395/450; 395/415; 395/497.04; 364/230.6; 364/DIG. 1
[58] Field of Search ............................ 395/425, 400; 364/200 MS, 900 MS

[56] References Cited

U.S. PATENT DOCUMENTS

| | | | |
|---|---|---|---|
| 4,695,950 | 9/1987 | Brandt et al. | 395/400 |
| 4,700,291 | 10/1987 | Saito | 395/400 |
| 4,727,484 | 2/1988 | Saito | 395/400 |
| 4,980,816 | 12/1990 | Fukuzawa et al. | 395/400 |
| 5,222,223 | 6/1993 | Webb, Jr. et al. | 395/425 |
| 5,307,477 | 4/1994 | Taylor et al. | 395/425 |

OTHER PUBLICATIONS

Memory Chip Organizations for Improved Reliability in Virtual Memories by S. K. Kwon, et al., IBM T D B, vol. 25, No. 6, Nov. 1982, pp. 2952–2957.

"Translation—Lookaside Buffer Consistency" by Patricia J. Teller, IEEE Computer (1990) pp. 26–36.

*Primary Examiner*—David L. Robertson
*Assistant Examiner*—Frank J. Asta
*Attorney, Agent, or Firm*—Michael A. Davis, Jr.

[57] ABSTRACT

A computer memory system having partitioned page address for instructions and operands. The partitioning scheme for the virtual addressing memory minimizes the delay between the translation logic and the page translation RAMs. Computer processor performance is delayed by only a single clock cycle by the sharing of the memory address bus control between two address processors.

2 Claims, 5 Drawing Sheets

PARTITIONING OF VIRTUAL ADDRESSING MEMORY

This is a continuation of application Ser. No. 07/691,622, filed Apr. 25, 1991, now abandoned.

BACKGROUND OF THE INVENTION

1. Field of the Invention

The invention disclosed broadly relates to memory addressing in a computer and more particularly relates to a paged virtual memory addressing scheme within a computer system.

2. Background Art

In computer memory systems, the instruction set calls for a fixed number of bits of memory addresses such as 16, yet larger memory regions are often required to store the necessary information. The solution is to use virtual memory—the 16 address bits mapped to a larger memory area. To do this, a logical address is often mapped to a physical address through a page translation random access memory (RAM). The 16 bit logical address may, for example, consist of a most significant 4 bit field which can be expanded to 11 most significant physical address bits through a page translation RAM and a 12 bit page address field which is used directly as the 12 least significant bits of the physical address. Thus, the 4 most significant logical address bits will access the physical address corresponding to a 4 k region of memory called the page. This 4 k region is addressable by the other 12 bits in the 16 bit address.

The translation logic is complicated because page addresses are mapped differently for instructions and operands. This implies two page translation RAMs, which will not fit on a single instruction dispatch integrated circuit chip. As a result, they are placed on the address translation and exception handling chips of the computer system. The biggest concern of this partitioning is the performance impact because of the frequency of address translation in any given instruction mix. The delay incurred by placing the translation RAMs on two different integrated circuit chips needs to be minimized.

OBJECTS OF THE INVENTION

It is therefore an object of the invention to provide a partitioning scheme for virtual addressing memory which minimizes the delay between the translation logic and the translation RAMs.

It is a further object of the invention to provide a virtual addressing scheme which does not degrade processor performance except for a single cycle delay incurred for address translation when crossing page address regions.

It is still a further object of the invention to avoid cycle latency for the return of translated addresses by sharing the memory address bus control between two address processors.

SUMMARY OF THE INVENTION

These and other objects, features and advantages of the invention are accomplished by tight coupling between address processors which leads to a fast response to a physical address request. Two translation lookaside buffers (TLBs) are used to hold the most recently accessed physical address for instruction pages and operand (data) pages. The physical address is generated on a second address processor at the request of the first address processor. The physical address bits are sourced by the second address processor which has a translation RAM output for a single cycle for updating the corresponding translation lookaside buffer and use in the memory access. On subsequent cycles, the first processor, using the appropriate TLB, will supply the complete address for memory operations. The TLBs used in the invention contain the logical page address. This allows a compare for hit/miss (a hit is when the logical page required is already in the TLB with its corresponding physical translation) determination which is essential for translation timing. For each memory access, comparators are checked to see if the logical address requested matches the previous one of that type of instruction or operand.

The partitioning allows the first processor to continue to control the number of cycles of physical address which are driven on the memory bus by the computer system. This is necessary because memory response to a request varies unpredictably due to arbitration contention. The first processor contains the logic which monitors the memory bus and determines when a request has been accepted. The second processor drives the address bus for one cycle following a miss. The first processor will store the value translated by the second processor into a TLB and drive it for subsequent cycles if necessary. This basic scheme alleviates the need to duplicate logic and to dedicate critical input/ output pins for memory monitoring on the second processor. The first processor drives the address bus in the same cycle it determines that a virtual page address can be translated into the TLB for a hit. The first processor continues to drive the address bus until memory receives the request from the first processor. When the addresses match, the TLB supplies the physical address and the translation cycle is avoided.

BRIEF DESCRIPTION OF THE DRAWINGS

These and other objects, features and advantages of the invention will be more fully appreciated with reference to the accompanying figures.

DESCRIPTION OF THE PREFERRED EMBODIMENT

Figure 1:
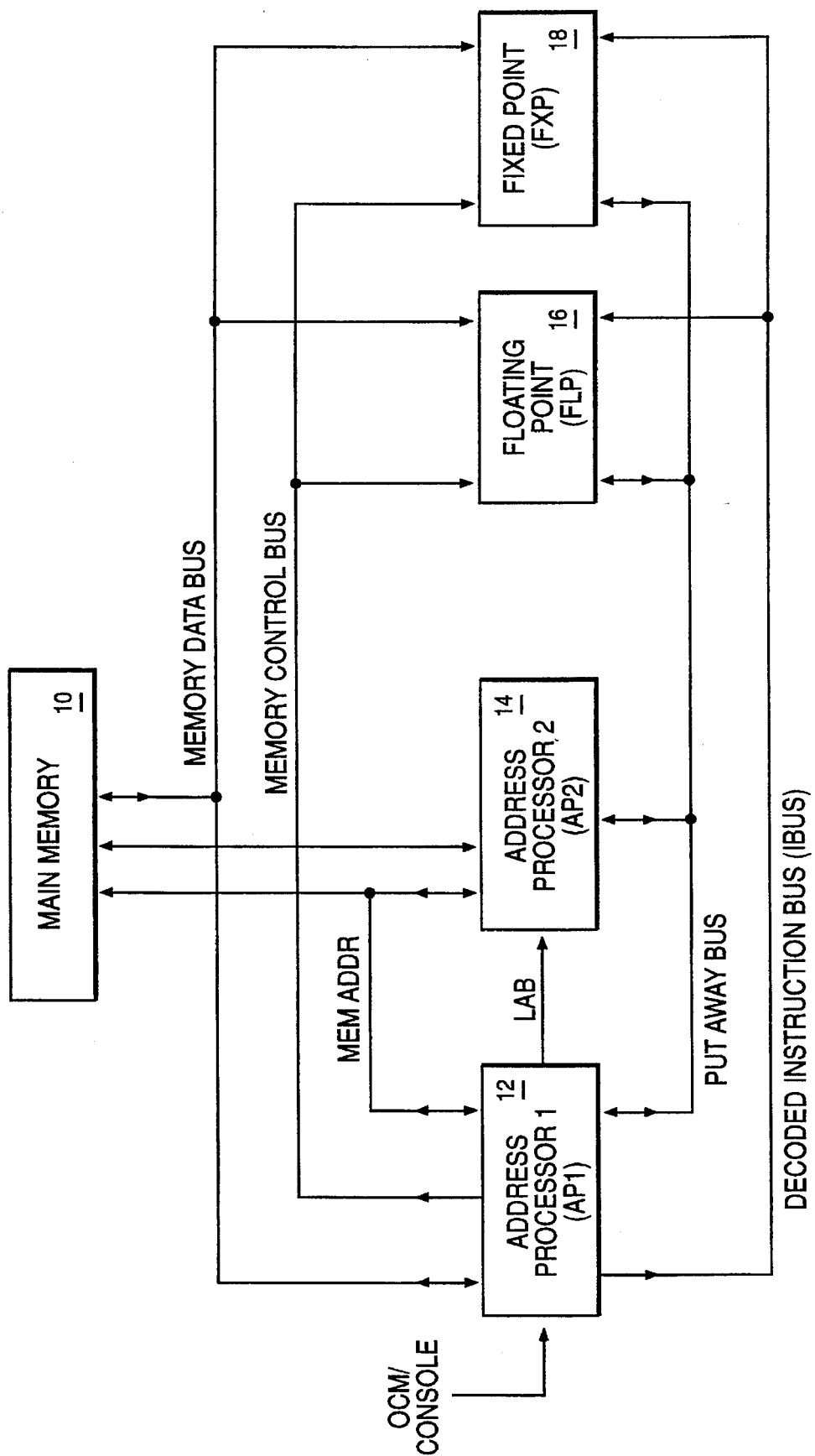
FIG. 1 is a block diagram of a typical computer system with address processing partitioned across two modules.

A typical computer system is shown in FIG. 1. Address processor 12 reads instructions from the main memory 10 and dispatches commands to execution elements such as fixed-point processor 18 and floating-point processor 16 or the address processor 14. The AP1 sources the instruction bus (I-bus) which issues service requests to the execution elements. Any general purpose partitioner updating is done across the put-away bus shown.

The translation logic is complicated because page addresses are mapped differently for instructions and operands. The delay incurred by placing the translation RAMs on two separate processors must be minimized.

Figure 2:
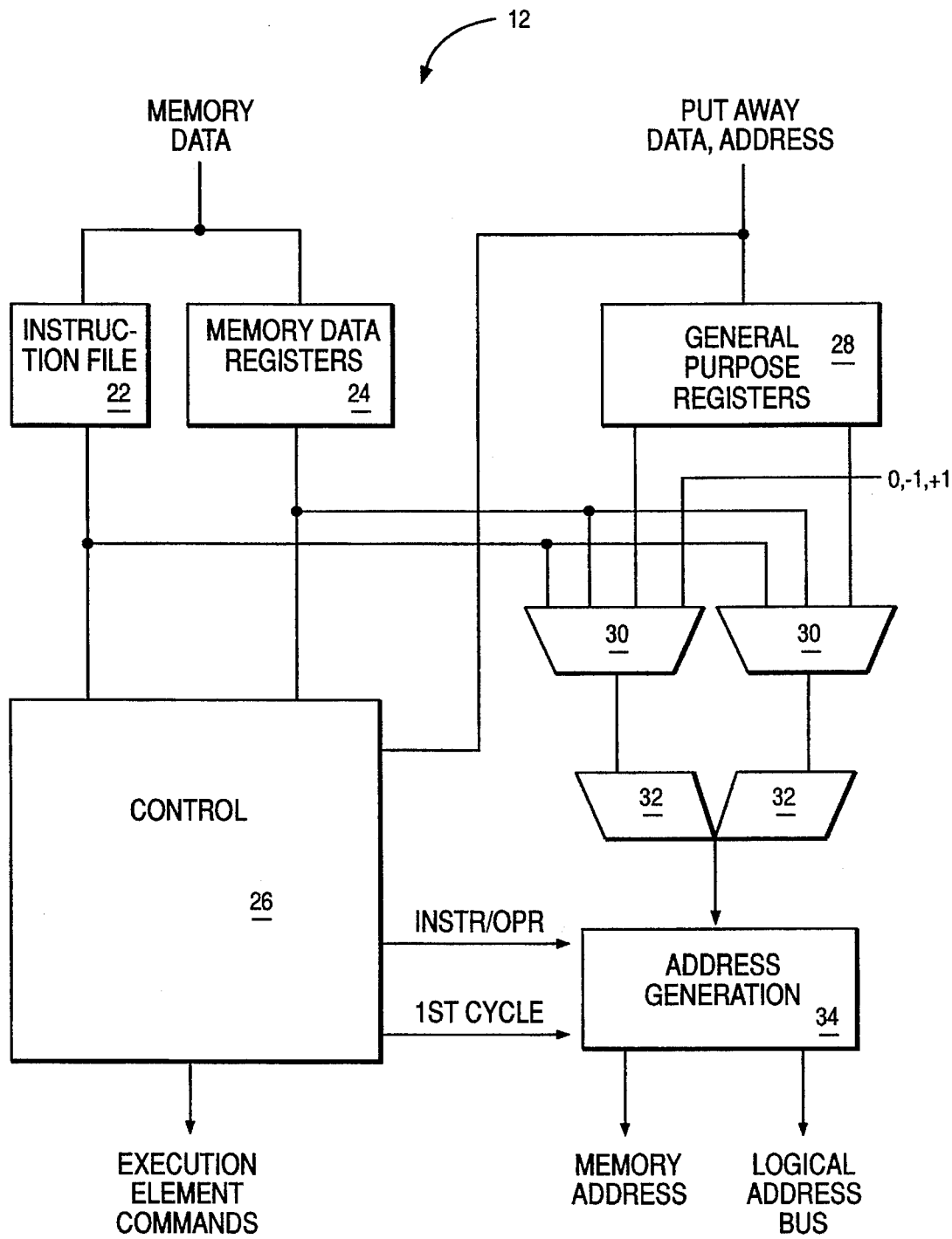
FIG. 2 is a drawing in schematic form of an address processor.

The address processor 12 is shown in FIG. 2 wherein the memory data proceeds to an instruction file 22 and memory data registers 24, which feed into a control source 26 which issues the execution element commands. The put-away data and addresses are fed into the general purpose register 28 which feeds via multiplexer 30 and arithmetic logic unit 32 to the address generator 34. The control unit 26 uses the memory data to send out the instruction/operand to the address generator 34 during the first cycle. The logical address bus contains a hit/miss detection bit and puts out the operand or instruction data, as well as the logical page address consisting of four bits and a one bit parity check.

Figure 3:
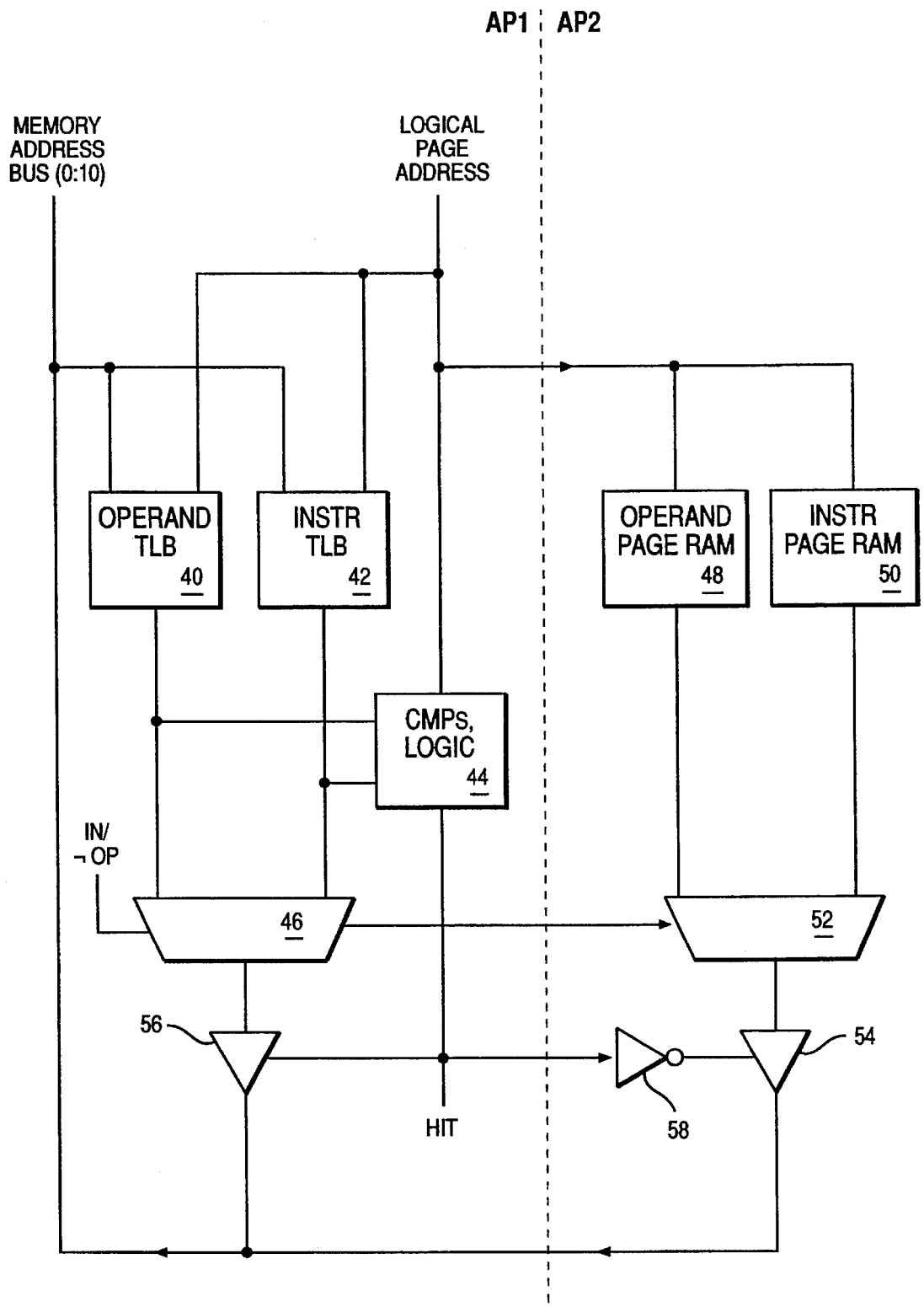
FIG. 3 is a detailed drawing of a part of the address processor showing interface between the two address processors.

The physical page transfer between AP1 and AP2 is shown in FIG. 3. The memory address bus inputs to the operand TLB 40 and the instruction TLB 42. A logical page address is also input into the operand TLB 40 and the instruction TLB 42. The output of the two TLBs is input to comparators 44 which perform a logic test to see if there is a hit or a miss, that is, a hit is when the logical page required is already in the TLB 40 or 42 with its corresponding physical translation. Instruction/operand multiplexer 46 is paired to the operand page RAM 48 and the instruction page RAM 50 of the address processor 2 (AP2). If there is a miss, AP2 is already been cycled so that its operand page RAM 48 and the instruction page RAM 50 can output, through multiplexer 52 and transceiver 54 (enabled by inverter 58) onto the memory bus the needed instruction or operand information and load these into the appropriate TLBs or the memory address bus. If there had been a hit, transceiver 56 would immediately be enabled to output the correct operand or instruction address onto the memory address bus through transceiver 56.

Figure 4:
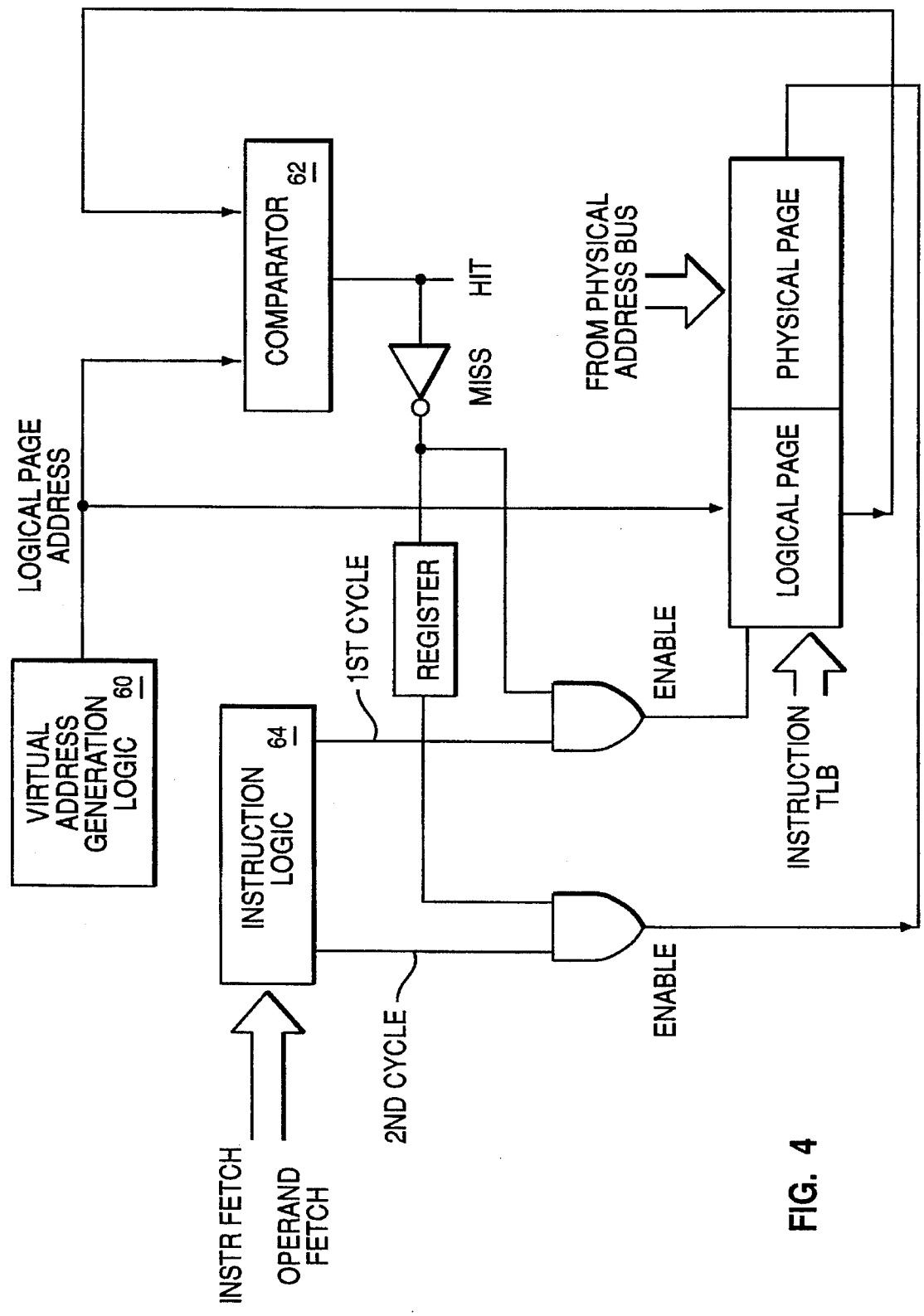
FIG. 4 is a detailed drawing of the translation lookaside buffer.

A detailed drawing of the makeup of the instruction TLB 42 is shown in FIG. 4. A virtual address generation logic 60 outputs a logical page address to a comparator 62 which determines whether there is a hit or a miss. Instruction logic 64 outputs on a first cycle the instruction fetch/operand fetch for the computer to the logical page and physical page address. On the second cycle, the instruction TLB is enabled to allow for the input of a new logical page/physical address if there had been a miss previous during cycle 1 in translating an instruction address.

Figure 5:
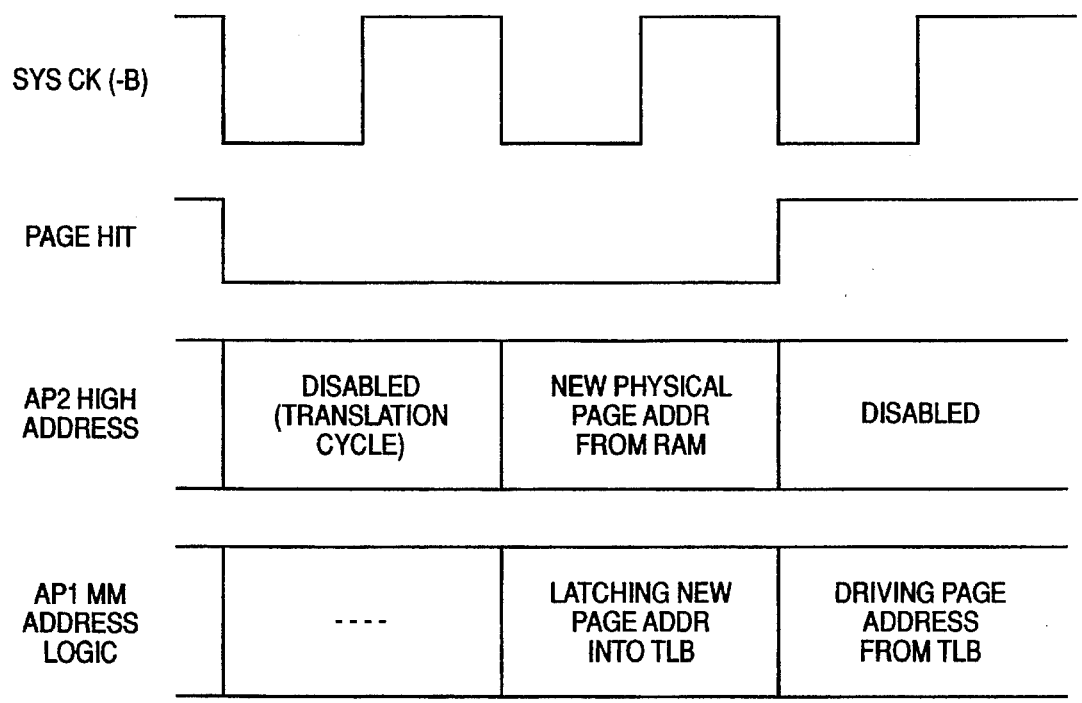
FIG. 5 shows the clock timing sequence for a logical page miss.

The timing diagram for a miss in the address translation table is shown in FIG. 5. In the first cycle of a miss, AP2 translates the page address to a physical address. During the second cycle, AP2 drives the page portion of the address bus. During a page miss, a new physical address is put in from AP2 which is latched by the new page address into the TLB. When the hit line returns high, AP2 is disabled and the driving page address is from TLB, if additional memory cycles are needed.

Figure 6:
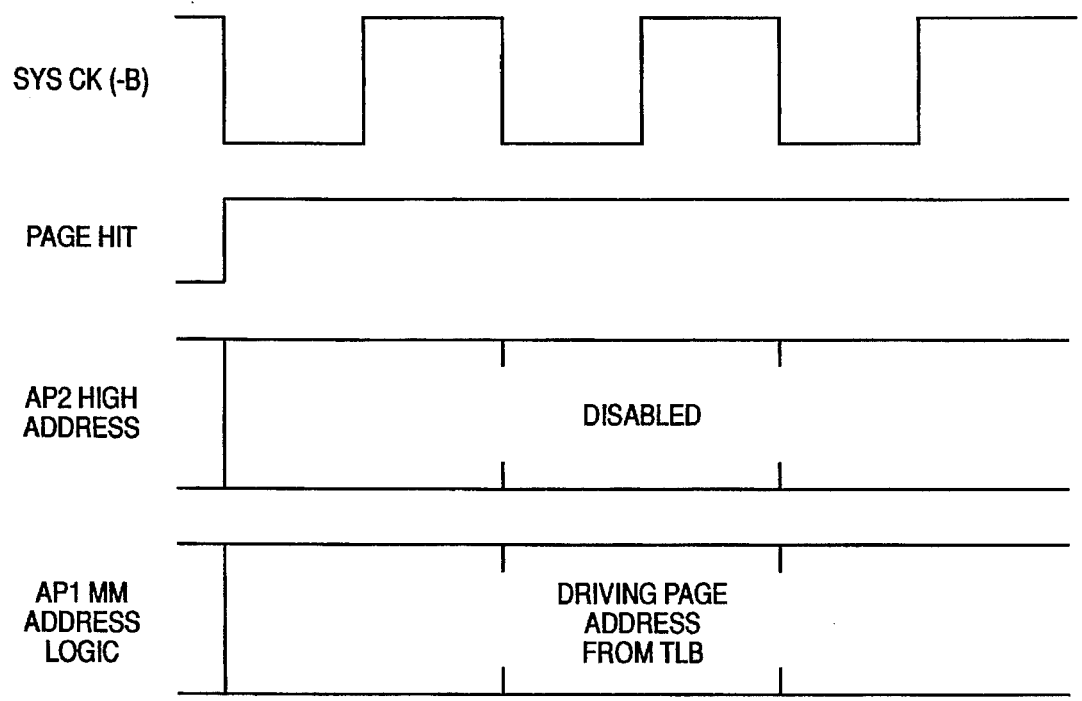
FIG. 6 is a timing diagram for a logical page hit.

If the page hit is high, as shown in FIG. 6, AP2 is disabled throughout the cycle and during the start of the second cycle, the driving page address is from a TLB. Therefore, the cost for a miss is one clock cycle, which is tolerable for a high speed computer system.

What is shown is a virtual addressing scheme for a computer system that maximizes performance while minimizing the delay between the translation logic and the translation RAMs poised on two individual circuit chips. The processor's performance is unaffected except for the single cycle delay incurred for address translations when crossing the 4 K address page region. In addition, a cycle latency for the return of the translated address was avoided by sharing the memory address bus control between AP1 and AP2 so that both can drive the bus.

Although a specific embodiment has been disclosed, it can be understood by those having skill in the art that changes can be made to the specific embodiment without departing from the spirit and the scope of the invention.

What is claimed is:

1. A computer system having an operand page memory and an instruction page memory, comprising:

first and second address processing units, wherein the second address processing unit includes the operand and instruction page memories;

an operand translation lookaside buffer in the first address processing unit associated with the operand page memory for storing a most recently accessed physical address for an operand page;

an instruction translation lookaside buffer in the first address processing unit associated with the instruction page memory for storing a most recently accessed physical address for an instruction page;

means for generating a logical address, wherein the address processing units output an associated physical address in response to said logical address; and means for determining whether the generated logical address is associated with one of the most recently accessed physical addresses and initiating outputting the associated physical address onto a memory address bus from a corresponding one of said operand and instruction translation lookaside buffers if the logical address is so associated, and initiating, within a single clock cycle, outputting the associated physical address onto the memory address bus from a corresponding one of said operand and instruction page memories if the logical address is not so associated.

2. A method of operating a computer system having an operand page memory and an instruction page memory, comprising the steps of:

storing a most recently accessed physical address for an operand page in an operand translation lookaside buffer in a first address processing unit associated with the operand page memory;

storing a most recently accessed physical address for an instruction page in an instruction translation lookaside buffer in the first address processing unit associated with the instruction page memory;

generating a logical address, wherein an associated physical address is output from one of the first address processing unit and a second address processing unit in response to said logical address, wherein the second address processing unit includes the operand and instruction page memories; and determining whether the generated logical address is associated with one of the most recently accessed physical addresses and initiating outputting the associated physical address onto a memory address bus from a corresponding one of said operand and instruction translation lookaside buffers if the logical address is so associated, and initiating, within a single clock cycle, outputting the associated physical address onto the memory address bus from a corresponding one of said operand and instruction page memories if the logical address is not so associated.

* * * * *